(12) United States Patent
Zhang et al.

(10) Patent No.: US 10,348,408 B2
(45) Date of Patent: Jul. 9, 2019

(54) METHOD AND APPARATUS FOR TRANSMITTING FRAME DATA BETWEEN NEAR-END DEVICE AND REMOTE DEVICE

(71) Applicant: DATANG MOBILE COMMUNICATIONS EQUIPMENT CO., LTD, Beijing (CN)

(72) Inventors: Zichen Zhang, Beijing (CN); Xiyuan Zhang, Beijing (CN); Guijie Geng, Beijing (CN)

(73) Assignee: DATANG MOBILE COMMUNICATIONS EQUIPMENT CO., LTD, Beijing (CN)

( * ) Notice: Subject to any disclaimer, the term of this patent is extended or adjusted under 35 U.S.C. 154(b) by 0 days.

(21) Appl. No.: 16/312,271

(22) PCT Filed: Mar. 30, 2017

(86) PCT No.: PCT/CN2017/078813
§ 371 (c)(1),
(2) Date: Dec. 20, 2018

(87) PCT Pub. No.: WO2017/219725
PCT Pub. Date: Dec. 28, 2017

(65) Prior Publication Data
US 2019/0165860 A1    May 30, 2019

(30) Foreign Application Priority Data

Jun. 21, 2016  (CN) .......................... 2016 1 0455045

(51) Int. Cl.
*H04L 12/10*     (2006.01)
*H04B 10/2575*   (2013.01)
(Continued)

(52) U.S. Cl.
CPC ..... *H04B 10/25759* (2013.01); *H04L 1/0006* (2013.01); *H04L 1/0061* (2013.01); *H04W 80/02* (2013.01)

(58) Field of Classification Search
CPC ...... H04B 10/2575; H04L 29/10; G06F 1/183
See application file for complete search history.

(56) References Cited

U.S. PATENT DOCUMENTS

| 9,225,423 B1 * | 12/2015 | Charbonneau-Lefort ................... H04B 10/2575 |
| 2012/0147757 A1 * | 6/2012 | Zhang ................... H04W 24/08 370/244 |
| 2013/0236188 A1 * | 9/2013 | Hung ................. H04B 10/2575 398/116 |

FOREIGN PATENT DOCUMENTS

| CN | 101730307 A | 6/2010 |
| CN | 103441799 A | 12/2013 |
| WO | 2016078401 A1 | 5/2016 |

* cited by examiner

*Primary Examiner* — Mansour Oveissi
(74) *Attorney, Agent, or Firm* — Gokalp Bayramoglu

(57) ABSTRACT

A method and an apparatus for transmitting frame data between a near-end device and a remote device are provided. The method includes: generating, by the near-end device, a base frame in a user-defined frame format, wherein a PHY converting chip is built in the near-end device, the base frame includes a first number of super groups, each super group includes a second number of base groups, and each base group includes media access control (MAC) frame structure data and an interframe gap; matching duration of the MAC frame structure data and the interframe gap with an output timing sequence of the PHY converting chip; and converting the base frame into an optical fiber signal through the PHY converting chip, and sending the optical fiber signal to the remote device.

21 Claims, 11 Drawing Sheets

Generate, by the near-end device, a base frame in a user-defined frame format; a physical layer (PHY) converting chip is built in the near-end device; the base frame includes a first number of super groups; the super group includes a second number of base groups; and the base group includes media access control (MAC) frame structure data and an interframe gap  —101

Match duration of the MAC frame structure data and the interframe gap with an output timing sequence of the physical layer (PHY) converting chip  —102

Convert the base frame into an optical fiber signal by way of the physical layer (PHY) converting chip, and send the optical fiber signal to the remote device  —103

(51) Int. Cl.
*H04W 80/02* (2009.01)
*H04L 1/00* (2006.01)

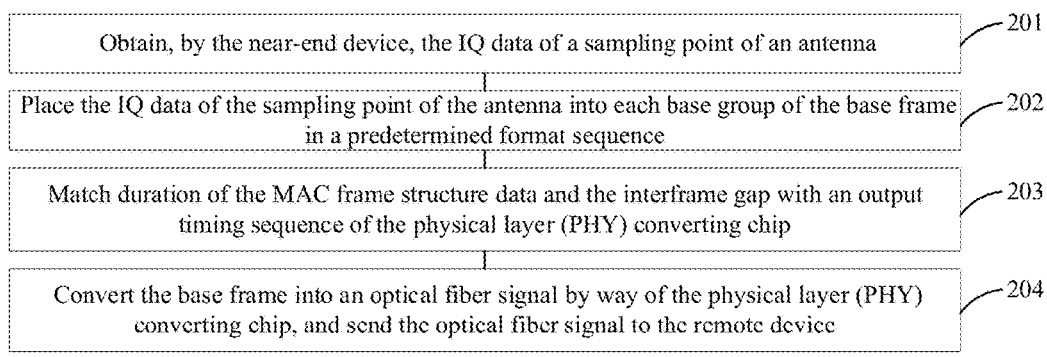

FIG. 3

```
                                                      ┌─201
Obtain, by the near-end device, the IQ data of a sampling point of an antenna ┌─202
Place the IQ data of the sampling point of the antenna into each base group of the base frame
in a predetermined format sequence ┌─203
Match duration of the MAC frame structure data and the interframe gap with an output
timing sequence of the physical layer (PHY) converting chip ┌─204
Convert the base frame into an optical fiber signal by way of the physical layer (PHY)
converting chip, and send the optical fiber signal to the remote device
```

FIG. 4

| Receive, by the remote device, an optical fiber signal sent from the near-end device; a physical layer (PHY) converting chip is built in the remote device | ⟵ 401 |

| Revert the optical fiber signal to a base frame in a predetermined output timing sequence by way of the physical layer (PHY) converting chip; the base frame includes a first number of super groups; the super group includes a second number of base groups; the base group includes media access control (MAC) frame structure data and an interframe gap; and match the output timing sequence of the physical layer (PHY) converting chip with duration of the MAC frame structure data and the interframe gap | ⟵ 402 |

FIG. 12

METHOD AND APPARATUS FOR TRANSMITTING FRAME DATA BETWEEN NEAR-END DEVICE AND REMOTE DEVICE

CROSS REFERENCE TO RELATED APPLICATIONS

This application is the national phase entry of International Application PCT/CN2017/078813, filed on Mar. 30, 2017, which is based upon and claims priority to Chinese Patent Application No. 201610455045.7, filed on Jun. 21, 2016, the entire contents of which are incorporated herein by reference.

TECHNICAL FIELD

The application relates to the field of communication technologies, and more particularly, to a method for transmitting frame data between a near-end device and a remote device and an apparatus for transmitting frame data between a near-end device and a remote device.

BACKGROUND

With the development of mobile communication technologies, high-speed transmission of large-capacity data has become an inevitable trend. Continuous high-speed transmission of IQ data and physical layer control words is required, which puts forward higher requirements for transmission protocols.

Existing IR (Interface between the RRU and the BBU) protocol and CPRI (Common Public Radio Interface) protocol are mature and stable communication interface protocols. However, in the process of transmitting message data, the IR protocol and the CPRI protocol may add K-code flag to the data, which makes the data unable to conform to the timing sequence of the PHY (Physical Layer) converting chip, and thus it is impossible to transmit data through network cables. In the meanwhile, IR and CPRI protocols do not transmit IQ data for each continuous base group, which may cause unstable transmission of the IQ data, increase the probability of packet loss and cause design difficulties, and make the application layer difficult for processing.

SUMMARY

In view of the above problems, embodiments of the application are proposed to provide a method for transmitting frame data between a near-end device and a remote device and an apparatus for transmitting frame data between a near-end device and a remote device to overcome the above problems or at least partially solve the above problems.

To solve the above problems, embodiments of the present application disclose a method for transmitting frame data between a near-end device and a remote device, which includes:

generating, by the near-end device, a base frame in a user-defined frame format; a physical layer (PHY) converting chip being built in the near-end device; the base frame comprising a first number of super groups; the super group comprising a second number of base groups; and the base group comprising media access control (MAC) frame structure data and an interframe gap;

matching duration of the MAC frame structure data and the interframe gap with an output timing sequence of the physical layer (PHY) converting chip; and converting the base frame into an optical fiber signal by way of the physical layer (PHY) converting chip, and sending the optical fiber signal to the remote device.

Preferably, the MAC frame structure data include IQ data. The step of generating, by the near-end device, a base frame in a user-defined frame format includes: obtaining, by the near-end device, the IQ data of a sampling point of an antenna; and placing the IQ data of the sampling point of the antenna into each base group of the base frame in a predetermined format sequence.

Preferably, the MAC frame structure data include a control management (CM) channel. The CM channel is configured to transmit a control word. The method further includes: receiving, by the near-end device, a base frame sent from the remote device; extracting a first control word from the CM channel of the base group of the base frame sent from the remote device, wherein the first control word represents internal uplink and downlink delay values of the remote device; calculating internal uplink and downlink delay values of the near-end device; calculating a link delay value based on the internal uplink and downlink delay values of the near-end device and the internal uplink and downlink delay values of the remote device; and adjusting a timing sequence of reading/writing a frame header based on the link delay value.

Preferably, the step of receiving, by the near-end device, a base frame sent from the remote device includes: receiving, by the near-end device, an optical fiber signal sent from the remote device; and reverting the optical fiber signal to the base frame by way of the physical layer (PHY) converting chip.

Preferably, the CM channel of the base group of the base frame sent from the near-end device to the remote device further includes a second control word. The second control word represents the link delay value. The remote device is configured to revert a radio frame header by using the second control word.

Preferably, the MAC frame structure data include a message channel. The message channel is configured to transmit an application layer message. The step of generating, by the near-end device, a base frame in a user-defined frame format includes: generating, by the near-end device, the application layer message by using an 8 B/10 B code; setting an SSD (Start of Stream Delimiter) indication and an ESD (End of Stream Delimiter) indication for the application layer message; the remote device being configured to resolve corresponding MAC frame structure data and perform a cyclic redundancy code (CRC) check on the MAC frame structure data when the SSD is detected; receiving the MAC frame structure data when the CRC check is correct; or discarding the MAC frame structure data when the CRC check is inaccurate; and placing the application layer message into the message channel.

Preferably, the method further includes: obtaining, by the near-end device, a relative location of a local frame header with respect to an associated frame header, wherein the local frame header is a frame header of the near-end device and the associated frame header is a frame header of the remote device; and performing frame header synchronization on the remote device based on the relative location.

Preferably, the method further includes: extracting, by the near-end device, a third control word from the CM channel of the base group of the base frame sent from the remote device. The third control word represents a frame header starting location of the super group.

The step of obtaining, by the near-end device, a relative location of a local frame header with respect to an associated frame header includes: calculating the relative location of the local frame header with respect to the associated frame header based on the third control word.

In the meanwhile, the embodiments of the present application also disclose a method for transmitting frame data between a near-end device and a remote device. The method includes:

receiving, by the remote device, an optical fiber signal sent from the near-end device; a physical layer (PHY) converting chip being built in the remote device; and reverting the optical fiber signal to a base frame in a predetermined output timing sequence by way of the physical layer (PHY) converting chip; the base frame comprising a first number of super groups; the super group comprising a second number of base groups; and the base group comprising media access control (MAC) frame structure data and an interframe gap; and matching the output timing sequence of the physical layer (PHY) converting chip with duration of the MAC frame structure data and the interframe gap.

Preferably, the MAC frame structure data includes a control management (CM) channel. The method further includes: calculating, by the remote device, internal uplink and downlink delay values of the remote device; generating a first control word based on the internal uplink and downlink delay values of the remote device, wherein the first control word represents the internal uplink and downlink delay values of the remote device; placing the first control word into the CM channel of the base group of the base frame to generate the base frame; and sending the base frame carrying the first control word to the near-end device by way of the physical layer (PHY) converting chip. The near-end device is configured to calculate a link delay value of the near-end device based on the first control word.

Preferably, the method further includes: extracting, by the remote device, a second control word from the CM channel of the base group of the base frame sent from the near-end device, wherein the second control word represents the link delay value; and reverting a radio frame header by using the second control word.

Preferably, the method further includes: detecting, by the remote device, whether a link has an SSD (Start of Stream Delimiter) of an application layer message; resolving MAC frame structure data corresponding to the application layer message and performing a cyclic redundancy code (CRC) check on the MAC frame structure data when the SSD is detected; receiving the MAC frame structure data when the CRC check is correct; or discarding the MAC frame structure data when the CRC check is inaccurate.

Preferably, the CM channel of the base group of the base frame sent from the remote device to the near-end device includes a third control word. The third control word represents a frame header starting location of a super group.

In the meanwhile, the embodiments of the present application also disclose an apparatus for transmitting frame data between a near-end device and a remote device. The apparatus includes:

a near-end generating module positioned on the near-end device, configured to generate a base frame in a user-defined frame format; a physical layer (PHY) converting chip being built in the near-end device; the base frame comprising a first number of super groups; the super group comprising a second number of base groups; and the base group comprising media access control (MAC) frame structure data and an interframe gap;

a near-end matching module positioned on the near-end device, configured to match duration of the MAC frame structure data and the interframe gap with an output timing sequence of the physical layer (PHY) converting chip; and a near-end sending module positioned on the near-end device, configured to convert the base frame into an optical fiber signal by way of the physical layer (PHY) converting chip, and to send the optical fiber signal to the remote device.

Preferably, the MAC frame structure data include: IQ data;

The near-end generating module includes: a near-end IQ data obtaining submodule, configured to obtain the IQ data of a sampling point of an antenna; and a near-end IQ data placing submodule, configured to place the IQ data of the sampling point of the antenna into each base group of the base frame in a predetermined format sequence.

Preferably, the MAC frame structure data include a control management (CM) channel. The CM channel is configured to transmit a control word. The apparatus further includes: a near-end receiving module positioned on the near-end device, configured to receive a base frame sent from the remote device; a near-end first control word extracting module positioned on the near-end device, configured to extract a first control word from the CM channel of the base group of the base frame sent from the remote device, wherein the first control word represents internal uplink and downlink delay values of the remote device; a near-end delay calculating module positioned on the near-end device, configured to calculate internal uplink and downlink delay values of the near-end device; a link delay calculating module positioned on the near-end device, configured to calculate a link delay value based on the internal uplink and downlink delay values of the near-end device and the internal uplink and downlink delay values of the remote device; and a near-end timing sequence adjusting module positioned on the near-end device, configured to adjust a timing sequence of reading/writing a frame header based on the link delay value.

Preferably, the near-end receiving module includes: a near-end optical fiber signal receiving submodule, configured to receive an optical fiber signal sent from the remote device; and a near-end base frame reverting submodule, configured to revert the optical fiber signal to the base frame by way of the physical layer (PHY) converting chip.

Preferably, the CM channel of the base group of the base frame sent from the near-end device to the remote device further includes a second control word. The second control word represents the link delay value. The remote device is configured to revert a radio frame header by using the second control word.

Preferably, the MAC frame structure data include a message channel. The message channel is configured to transmit an application layer message.

the near-end generating module comprises:

a near-end application layer message generating submodule, configured to generate the application layer message by using an 8 B/10 B code;

a near-end indication setting submodule, configured to set an SSD (Start of Stream Delimiter) indication and an ESD (End of Stream Delimiter) indication for the application layer message, the remote device being configured to resolve corresponding MAC frame structure data and perform a cyclic redundancy code (CRC) check on the MAC frame structure data when the SSD is detected; to receive the MAC frame structure data when the CRC check is correct; or to discard the MAC frame structure data when the CRC check is inaccurate; and a near-end application layer message placing submodule, configured to place the application layer message into the message channel.

Preferably, the apparatus further includes: a frame header relative location obtaining module positioned on the near-end device, configured to obtain a relative location of a local frame header with respect to an associated frame header, wherein the local frame header is a frame header of the near-end device, and the associated frame header is a frame header of the remote device; and a near-end frame header synchronization module positioned on the near-end device, configured to perform frame header synchronization on the remote device based on the relative location.

Preferably, the apparatus further includes a near-end third control word extracting module positioned on the near-end device, configured to extract a third control word from the CM channel of the base group of the base frame sent from the remote device. The third control word represents a frame header starting location of the super group.

the frame header relative location obtaining module comprises:

a near-end relative location calculating submodule, configured to calculate the relative location of the local frame header with respect to the associated frame header based on the third control word.

In the meanwhile, the embodiments of the present application also disclose an apparatus for transmitting frame data between a near-end device and a remote device. The apparatus includes: a remote receiving module positioned on the remote device, configured to receive an optical fiber signal sent from the near-end device, wherein a physical layer (PHY) converting chip is built in the remote device; and a remote reverting module positioned on the remote device, configured to revert the optical fiber signal to a base frame in a predetermined output timing sequence by way of the physical layer (PHY) converting chip. The base frame includes a first number of super groups. The super group includes a second number of base groups. The base group includes media access control (MAC) frame structure data and an interframe gap. The output timing sequence of the physical layer (PHY) converting chip matches with duration of the MAC frame structure data and the interframe gap.

Preferably, the MAC frame structure data include a control management (CM) channel. The apparatus further includes: a remote delay calculating module positioned on the remote device, configured to calculate internal uplink and downlink delay values of the remote device; a remote first control word generating module positioned on the remote device, configured to generate a first control word based on the internal uplink and downlink delay values of the remote device, wherein the first control word represents the internal uplink and downlink delay values of the remote device; a remote base frame generating module positioned on the remote device, configured to place the first control word into the CM channel of the base group of the base frame to generate the base frame; and a remote base frame sending module positioned on the remote device, configured to send the base frame carrying the first control word to the near-end device by way of the physical layer (PHY) converting chip. The near-end device is configured to calculate a link delay value of the near-end device based on the first control word.

Preferably, the apparatus further includes: a second control word extracting module positioned on the remote device, configured to extract a second control word from the CM channel of the base group of the base frame sent from the near-end device, wherein the second control word represents the link delay value; and a remote radio frame header reverting module positioned on the remote device, configured to revert a radio frame header by using the second control word.

Preferably, the apparatus further includes: a remote SSD detecting module positioned on the remote device, configured to detect whether a link has an SSD (Start of Stream Delimiter) of an application layer message; a remote CRC check module positioned on the remote device, configured to resolve MAC frame structure data corresponding to the application layer message and perform a cyclic redundancy code (CRC) check on the MAC frame structure data when the SSD is detected; a remote data receiving module positioned on the remote device, configured to receive the MAC frame structure data when the CRC check is correct; and a remote data discarding module positioned on the remote device, configured to discard the MAC frame structure data when the CRC check is inaccurate.

Preferably, the CM channel of the base group of the base frame sent from the remote device to the near-end device includes a third control word. The third control word represents a frame header starting location of a super group.

The embodiments of the present application also disclose a computer-readable recording medium having recorded thereon a program for executing the above methods.

The embodiments of the present application include following advantages.

In the embodiments of the present application, a base frame is user-defined, each base frame includes a plurality of super groups, each super group includes a plurality of base groups, and each base group is composed of media access control (MAC) frame structure data and an interframe gap. The duration of the MAC frame structure data and the interframe gap matches the output timing sequence of a bottom-layer PHY converting chip, such that the bottom-layer PHY converting chip can normally receive and send data. The MAC frame structure data of each base group transmit baseband IQ data, which guarantees continuous transmission of the IQ data in each base frame and satisfies application layer requirements. A control word is transmitted in a CM channel of the MAC frame structure data by means of a user-defined control word, which guarantees normal interaction of bottom-layer control information.

BRIEF DESCRIPTION OF THE DRAWINGS

FIG. 3 is a schematic structural diagram of a base group according to an embodiment of the application;

FIG. 4 is a flowchart of steps of another method for transmitting frame data between a near-end device and a remote device according to an embodiment of the application;

FIG. 12 is a flowchart of steps of a method for transmitting frame data between a near-end device and a remote device according to an embodiment of the application;

DETAILED DESCRIPTION OF THE EMBODIMENTS

To make the foregoing objectives, features, and advantages of the application more apparent and lucid, the following further describes in detail the application with reference to the accompanying drawings and embodiments.

One of core ideas of the embodiments of the application lies in that a base frame structure is user-defined, such that a base frame can satisfy timing sequence requirements of a physical layer (PHY) converting chip, and in the meanwhile, continuous stable transmission of IQ data can be implemented.

Figure 1:
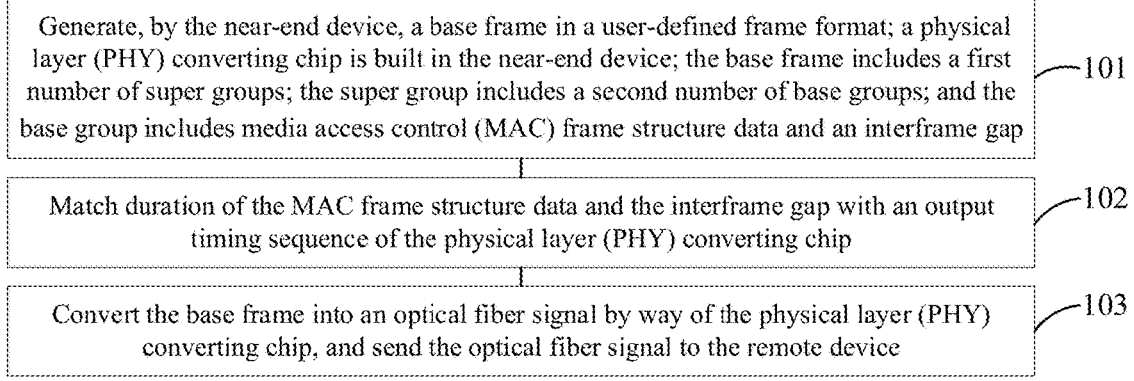
FIG. 1 is a flowchart of steps of a method for transmitting frame data between a near-end device and a remote device according to an embodiment of the application.

Referring to FIG. 1, a flowchart of steps of a method for transmitting frame data between a near-end device and a remote device according to an embodiment of the application is illustrated, and the method may specifically include following steps.

Step 101: generating, by the near-end device, a base frame in a user-defined frame format. A physical layer (PHY) converting chip is built in the near-end device. The base frame includes a first number of super groups. The super group includes a second number of base groups. The base group includes media access control (MAC) frame structure data and an interframe gap.

In the embodiments of the present application, the near-end device refers to a base station, and the remote device refers to a radio remote unit (RRU). Specifically, the base station obtains the IQ data of a cell and generates a base frame based on a user-defined frame format. The base station is connected to RRU through an optical fiber. There is a PHY converting chip in both the base station and the RRU. The PHY converting chip converts a data frame of a data link layer into a corresponding signal form of a transmission medium, and transmits the signal over the transmission medium, and then converts the signal into a data frame and transfers the data frame to the data link layer. In the embodiments of the present application, the transmission medium is an optical fiber, and the signal form is an optical fiber signal. The interface timing sequence of the PHY converting chip includes a 1-bit valid signal as a data enable signal, transmits valid data, and identifies the beginning and end of the valid data. In the IR and CPRI protocols, a frame header and frame trailer identifiers are added to the data, and the data doesn't need the valid signal and does not satisfy the timing sequence of the PHY converting chip. In the embodiments of the present application, an interframe gap is provided for the base group, such that the PHY converting chip can set an enable signal during the interframe gap.

Step 102: matching duration of the MAC frame structure data and the interframe gap with an output timing sequence of the physical layer (PHY) converting chip.

The base station matches the duration of the MAC frame structure data and the interframe gap of each base group with the output timing sequence of the physical layer (PHY) converting chip. Duration of the MAC frame structure data and the interframe gap may be matched with an output timing sequence of the physical layer (PHY) converting chip, such that the PHY converting chip can set an enable signal during the interframe gap to identify the beginning and end of the MAC frame structure data, thereby ensuring that the transmitted data are not in disorder.

Step 103: converting the base frame into an optical fiber signal by way of the physical layer (PHY) converting chip, and sending the optical fiber signal to the remote device.

The base frame data are converted into an optical fiber signal by way of the physical layer (PHY) converting chip, and then the optical fiber signal is transmitted to the remote device through an optical fiber.

Figure 2:
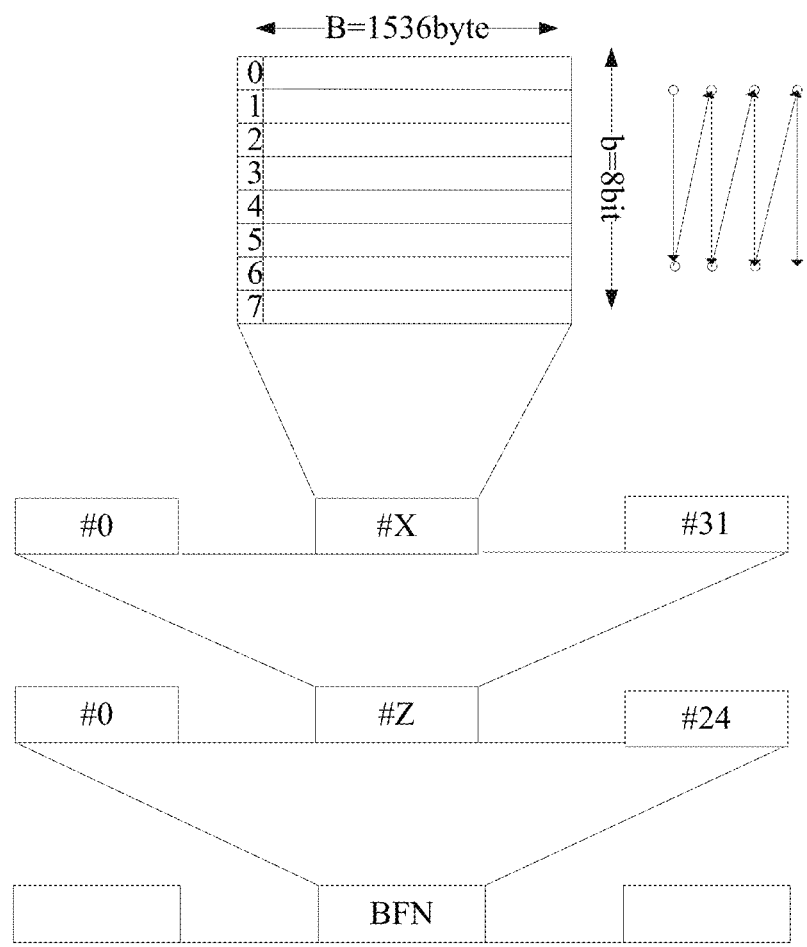
FIG. 2 is a schematic structural diagram of a base frame according to an embodiment of the application.

Referring to FIG. 2, a schematic structural diagram of a base frame according to an embodiment of the application is illustrated. In this embodiment, the base frame has a duration of 10 ms. One base frame includes 25 super groups, and each super group includes 32 base groups. As a base unit of data transmission, the base group has a duration of 12.5 us. Each base group is composed of one MAC frame structure data and one interframe gap. The base group occupies 1,536 bytes, wherein the MAC frame structure data occupies 1,492 bytes, and the interframe gap occupies 44 bytes. The interframe gap matches the output timing sequence of the PHY chip.

Referring to FIG. 3, a schematic structural diagram of a base group according to an embodiment of the application is illustrated. In the embodiments of the present application, the base group includes MAC frame structure data and a interframe gap.

The MAC frame structure data include: a preamble, a destination address, a source address, a type/length field, an FCS domain, frame count, IQ data, a CM channel, a message channel, and a reserved field.

The preamble, the destination address, the source address, the type/length field, and the FCS domain are necessary transmission overheads. The number of occupied bytes is as follows: the preamble occupies 8 bytes, the destination address occupies 6 bytes, the source address occupies 6 bytes, the type/length field occupies 2 bytes, and the FCS domain occupies 4 bytes.

The frame count, the IQ data, the CM channel, the message channel, and the reserved field are actual overheads. The number of occupied bytes is as follows: the frame count occupies 2 bytes, the IQ data occupies 1,440 bytes, the message channel occupies 18 bytes, the CM channel occupies 4 bytes, and the reserved field occupies 2 bytes.

The interframe gap occupies 44 bytes. The entire base group totally occupies 1,536 bytes.

Referring to FIG. 4, a flowchart of steps of another method for transmitting frame data between a near-end device and a remote device according to an embodiment of the application is illustrated, and the method may specifically include following steps.

Step 201: obtaining, by the near-end device, the IQ data of a sampling point of an antenna.

In a scene of receiving and sending baseband data, a base station takes charge of transmission of the IQ data of each sampling point of each antenna within a cell.

Step 202: placing the IQ data of the sampling point of the antenna into each base group of the base frame in a predetermined format sequence.

The MAC frame structure data of each base group transmit baseband IQ data, which guarantees continuous transmission of the IQ data in each base frame and satisfies application layer requirements.

The number of bytes occupied by the IQ data in the base group is equal to: the number of sampling points of the current bandwidth of the cell corresponding to the near-end device×the bit width×the number of antennas.

Currently, the cell bandwidth includes 20M, 10M, and 5M. Taking a base group having a duration of 12.5 us and a 20M cell bandwidth compression mode as an example (possibly the maximum data volume currently), a transmission line rate corresponding to the 20M bandwidth is 30.72M sampling points per second. Therefore, in the case that each base group has a duration of 12.5 us, one base group can transmit 384 sampling point. Each sampling point is one IQ datum, and 1 IQ datum includes I data of 15 bit sampling bit width and Q data of 15 bit sampling bit width.

The size of the IQ data is equal to 384×15 bit×2=11520 bit=1440 byte.

When the cell bandwidth is 10M, the size of the IQ data is 720 bytes. When the cell bandwidth is 5M, the size of the IQ data is 360 bytes.

Specifically, the IQ data are placed in the sequence of the antennas and the sampling points, wherein the antennas precede over the sampling points. That is, the IQ data of the sampling point 0 of the antenna 0 are first placed in the base group, then the IQ data of the sampling point 0 of the antenna 1 are placed in the base group, then the IQ data of the sampling point 0 of the antenna 2 are placed in the base group, and so on. After the IQ data of all the antennas corresponding to the sampling point 0 are placed, then the IQ data of the sampling point 1 of the antenna 0 are placed, and then the IQ data of the sampling point 1 of the antenna 1 are placed, and so on. After the IQ data of all the sampling points of all the antennas are placed, the above steps are cycled.

Step 203: matching duration of the MAC frame structure data and the interframe gap with an output timing sequence of the physical layer (PHY) converting chip.

Step 204: converting the base frame into an optical fiber signal by way of the physical layer (PHY) converting chip, and sending the optical fiber signal to the remote device.

As a preferred example of the embodiment of the present application, based on a mapping rule of the IQ data (i.e., the format sequence of the IQ data), it is stipulated that the sampling bit width I corresponding to the 20M-bandwidth cell is 7 bits, and the corresponding sampling bit width Q is 7 bits; the sampling bit width I corresponding to the 10M-bandwidth cell is 15 bits, and the corresponding sampling bit width Q is 15 bits; and the sampling bit width I corresponding to the 5M-bandwidth cell is 15 bits, and the corresponding sampling bit width Q is 15 bits.

It is also stipulated that the maximum number of days supported by the 20M-bandwidth cell is 2, the maximum number of days supported by the 10M-bandwidth cell is 2, and the maximum number of days supported by the 5M-bandwidth cell is 4. When transmitting the IQ data, the IQ data of the antenna in top priority are transmitted first, and then the IQ data of the antenna in lower priority are transmitted.

It is also stipulated that the maximum number of sampling points supported by the 20M-bandwidth cell is 384, the maximum number of sampling points supported by the 10M-bandwidth cell is 192, and the maximum number of sampling points supported by the 5M-bandwidth cell is 96. When transmitting the IQ data, the IQ data of the sampling point in top priority are transmitted first, and then the IQ data of the sampling point in lower priority are transmitted.

Figure 5:
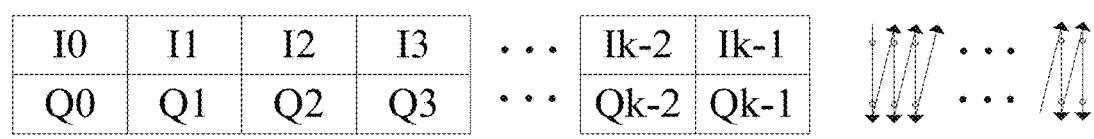
FIG. 5 is a schematic diagram of a format sequence of transmitting IQ data according to an embodiment of the application.

Referring to FIG. 5, a schematic diagram of a format sequence of transmitting the IQ data according to an embodiment of the application is illustrated. In FIG. 5, I0 represents the I data of the sampling point 0, Q0 represents the Q data of the sampling point 0, and so on; and K represents the sampling bit width. The format sequence of data transmission is as follows: the I data of a sampling point in top priority are transmitted first, and then the Q data of this sampling point are transmitted. That is, data are transmitted based on the sequence of the sampling points. For example, the I data of the sampling point 0 is transmitted first, then the Q data of the sampling point 0 is transmitted, then the I data of the sampling point 1 is transmitted, and the Q data of the sampling point 1 is transmitted.

Figure 6:
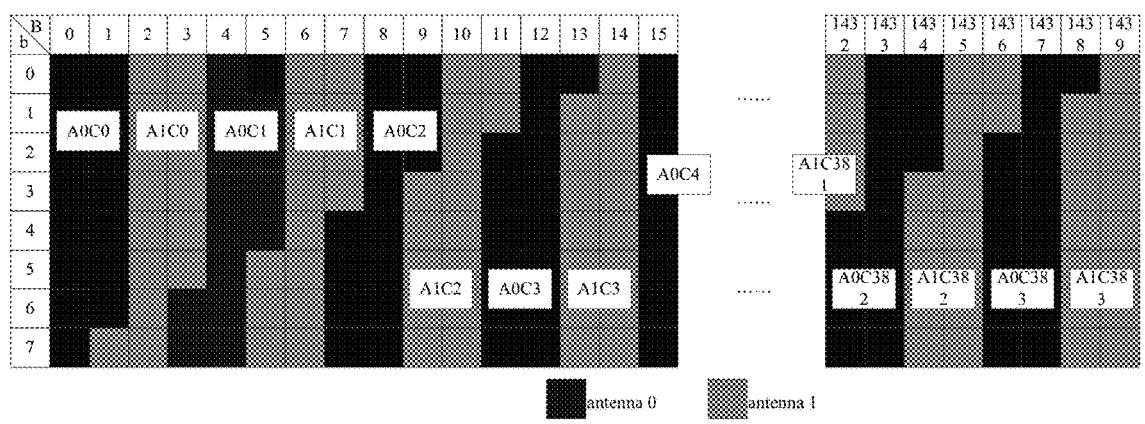
FIG. 6 is a schematic diagram of a sequence of transmitting sampling points in a 20M-bandwidth cell according to an embodiment of the application.

Referring to FIG. 6, a schematic diagram of a sequence of transmitting sampling points in a 20M-bandwidth cell according to an embodiment of the application is illustrated. According to Gigabit Ethernet port transmission, one 12.5 us base group can only transmit 384*30 bit data at maximum. Therefore, in a 20M cell, one base group can only transmit the IQ data of one two-antenna compressed cell, and the number of sampling points is 384. In FIG. 6, the abscissa represents byte and the ordinate represents bit, each small block represents 1-bit data, A represents an antenna, C represents a sampling point, and different colors represent different antennas; and a region of one type of color represents 15 bit data of one sampling point.

First, the data A0C0 of the sampling point 0 of the antenna 0 are transmitted, then the data A1C0 of the sampling point 0 of the antenna 1 are transmitted, then the data A0C1 of the sampling point 1 of the antenna 0 are transmitted, then the data A1C1 of the sampling point 1 of the antenna 1 are transmitted, then the data A0C2 of the sampling point 2 of the antenna 0 are transmitted, then the data A1C2 of the sampling point 2 of the antenna 1 are transmitted, . . . then the data A0C383 of the sampling point 383 of the antenna 0 are transmitted, and then the data A1C383 of the sampling point 383 of the antenna 1 are transmitted.

Figure 7:
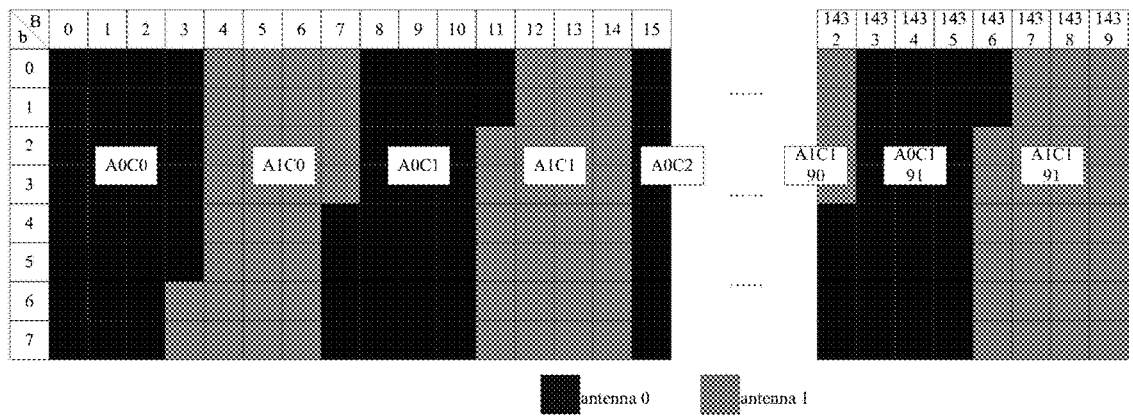
FIG. 7 is a schematic diagram of a sequence of transmitting sampling points in a 10M-bandwidth cell according to an embodiment of the application.

Referring to FIG. 7, a schematic diagram of a sequence of transmitting sampling points in a 10M-bandwidth cell according to an embodiment of the application is illustrated. According to Gigabit Ethernet port transmission, one 12.5 us base group can only transmit 192*2*30 bit data at maximum. Therefore, in a 10M cell, one base group can only transmit the IQ data of one two-antenna uncompressed cell, and the number of sampling points is 192. In FIG. 7, the abscissa represents byte and the ordinate represents bit, each small block represents 1-bit data, A represents an antenna, C represents a sampling point, and different colors represent different antennas; and a region of one type of color represents 30 bit data of one sampling point.

First, the data A0C0 of the sampling point 0 of the antenna 0 are transmitted, then the data A1C0 of the sampling point 0 of the antenna 1 are transmitted, then the data A0C1 of the sampling point 1 of the antenna 0 are transmitted, then the data A1C1 of the sampling point 1 of the antenna 1 are transmitted, then the data A0C2 of the sampling point 2 of the antenna 0 are transmitted, then the data A1C2 of the sampling point 2 of the antenna 1 are transmitted, . . . then the data A0C191 of the sampling point 191 of the antenna 0 are transmitted, and then the data A1C191 of the sampling point 191 of the antenna 1 are transmitted.

Figure 8:
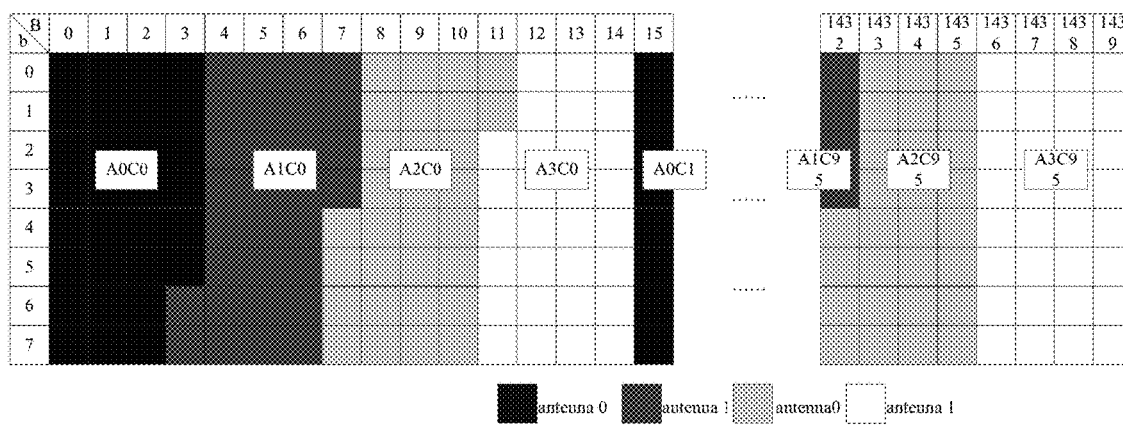
FIG. 8 is a schematic diagram of a sequence of transmitting sampling points in a 5M-bandwidth cell according to an embodiment of the application.

Referring to FIG. 8, a schematic diagram of a sequence of transmitting sampling points in a 5M-bandwidth cell according to an embodiment of the application is illustrated. According to Gigabit Ethernet port transmission, one 12.5 us base group can only transmit 96*4*30 bit data at maximum. Therefore, in a 5M cell, one base group can only transmit the IQ data of two two-antenna uncompressed cell or the IQ data of one four-antenna uncompressed cell at maximum, and the number of sampling points is 96. In FIG. 8, the abscissa represents byte and the ordinate represents bit, each small block represents 1-bit data, A represents an antenna, C represents a sampling point, and different colors represent different antennas; and a region of one type of color represents 30 bit data of one sampling point.

First, the data A0C0 of the sampling point 0 of the antenna 0 are transmitted, then the data A1C0 of the sampling point 0 of the antenna 1 are transmitted, then the data A2C0 of the sampling point 0 of the antenna 2 are transmitted, then the data A3C0 of the sampling point 0 of the antenna 3 are transmitted, then the data A0C1 of the sampling point 1 of the antenna 0 are transmitted, then the data A1C1 of the sampling point 1 of the antenna 1 are transmitted, . . . then the data A2C95 of the sampling point 95 of the antenna 2 are transmitted, and then the data A3C95 of the sampling point 95 of the antenna 3 are transmitted.

Figure 9:
FIG. 9 is a flowchart of steps of still another method for transmitting frame data between a near-end device and a remote device according to an embodiment of the application.

Referring to FIG. 9, a flowchart of steps of still another method for transmitting frame data between a near-end device and a remote device according to an embodiment of the application is illustrated, and the method may specifically include following steps.

Step 301: generating, by the near-end device, a base frame in a user-defined frame format. A physical layer (PHY) converting chip is built in the near-end device. The base frame includes a first number of super groups. The super group includes a second number of base groups. The base group includes media access control (MAC) frame structure data and an interframe gap.

As a preferred example of the embodiments of the application, the MAC frame structure data further include a message channel, wherein the message channel is configured to transmit an application layer message.

The Step 301 may specifically include following substep:

Substep S11: generating, by the near-end device, the application layer message by using an 8 B/10 B code.

The application layer message is configured to transmit an application layer message to achieve normal information interaction between an near-end base station and the RRU and version upgrade and log extraction, etc. A message channel occupies 18 bytes in each base group, and an application layer message in a 10 ms base frame occupies 18 byte*8 bit*800=115200 bit. Therefore, the application layer message has a bandwidth of about 11.5 Mbps. In the embodiments of the present application, it is stipulated that an application layer message in the message channel is generated using 8 B/10 B encoding.

Substep S12: setting an SSD (Start of Stream Delimiter) indication and an ESD (End of Stream Delimiter) indication for the application layer message, wherein the remote device is configured to resolve corresponding MAC frame structure data and perform a cyclic redundancy code (CRC) check on the MAC frame structure data when the SSD is detected; receiving the MAC frame structure data when the CRC check is correct; or discarding the MAC frame structure data when the CRC check is inaccurate.

The remote device decides whether the application layer message exists by checking, in real time, whether there is the SSD on a link. The remote device resolves the MAC frame structure data and performs the cyclic redundancy code (CRC) check on the MAC frame structure data when the SSD is detected. The MAC frame structure data are received when the CRC check is correct; or the MAC frame structure data are discarded when the CRC check is inaccurate.

Substep S13: placing the application layer message into the message channel.

When the near-end device needs to transmit the application layer message, the application layer message is placed into the message channel of the base group. When the near-end device does not need to transmit the application layer message, 0 is filled into the message channel.

Step 302: matching duration of the MAC frame structure data and the interframe gap with an output timing sequence of the physical layer (PHY) converting chip.

Step 303: converting the base frame into an optical fiber signal by way of the physical layer (PHY) converting chip, and sending the optical fiber signal to the remote device.

Step 304: receiving, by the near-end device, a base frame sent from the remote device. The MAC frame structure data further include a control management (CM) channel, wherein the CM channel is configured to transmit a control word.

The CM (control management) channel is mainly configured to exchange bottom-layer link information, such as radio frame number, RRU ID, power failure alarm, and protocol version, etc. The CM channel provides some access information (such as rate matching, whether to access, whether a power failure happens, etc.) for the application layer and provides simple methods (such as remote power failure, network cable switching, etc.) for controlling a slave device. The CM channel only occupies 4 bytes in the base group, and the CM channel in each base group is occupied by the time division mechanism, and cycles with one super group as a period (400 us).

Each super group totally has 32 control words, which are grouped into eight subchannels (every four control words constitute one subchannel), wherein the subchannel number Ns=0 . . . 7, and the control word number of each subchannel is Ys=0 . . . 3. Therefore, the control word number in each super group is Y=Ns+8*Ys. Specifically, the control word includes: Y0: transmitting a K28.5 field, configured to indicate a super group beginning, wherein other control fields are not the same as this field in content; Y1: transmitting a current protocol version number; Y2: transmitting an RRUID update mode, increased progressively or decreased progressively; Y3: transmitting remote device power failure alarm information; Y4: transmitting current sent message packet count information, configured to receive end message packet transmission monitoring; Y8: transmitting a super group number, configured to indicate radio frame beginning; Y9: transmitting a remote device reset signal; Y10: transmitting XOR values of Y2, Y18 and Y26; Y11: transmitting a link loopback command for notifying the remote device by the near-end device; Y16: transmitting a radio frame number, a low byte; Y17: transmitting the sum of internal uplink and downlink delay values of the remote device, the unit is clk; Y18: transmitting the RRUID; Y19: transmitting a network port switching command for notifying the remote device by the near-end device; Y24: transmitting a radio frame number, a high byte; Y25: transmitting a network cable link delay value; Y26: transmitting an RRUID effective range value; Y27: transmitting a near-end device network port number; and reserving other fields.

As a preferred example of the embodiments of the application, the Step 304 may specifically include following sub steps:

Substep S21: receiving, by the near-end device, an optical fiber signal sent from the remote device; and Sub step S22: reverting the optical fiber signal to the base frame by way of the physical layer (PHY) converting chip.

Step 305: extracting a first control word from the CM channel of the base group of the base frame sent from the remote device, wherein the first control word represents internal uplink and downlink delay values of the remote device. The internal uplink and downlink delay values of the remote device represent uplink and downlink delay values of the near-end device and a network cable. The first control word specifically may be a Y17 control word among the above control words.

Step 306: calculating internal uplink and downlink delay values of the near-end device.

The internal uplink and downlink delay values of the near-end device represent uplink and downlink delay values of the remote device and a network cable.

Step 307: calculating a link delay value based on the internal uplink and downlink delay values of the near-end device and the internal uplink and downlink delay values of the remote device.

Specifically, the link delay value is equal to (the internal uplink and downlink delay values of the near-end device– the internal uplink and downlink delay values of the remote device)/2.

Step 308: adjusting a timing sequence of reading/writing a frame header based on the link delay value.

After the link delay value is calculated, the link delay value is outputted to a frame header management module of the near-end device to adjust the timing sequence of reading/ writing a frame header by a built-in buffer pool.

As a preferred example of the embodiments of the application, the CM channel of the base group of the base frame sent from the near-end device to the remote device further includes a second control word. The second control word represents the link delay value. The remote device is configured to revert a radio frame header by using the second control word.

As a preferred example of the embodiments of the application, the method further includes:

Step 309: obtaining, by the near-end device, a relative location of a local frame header with respect to an associated frame header. The local frame header is a frame header of the near-end device, and the associated frame header is a frame header of the remote device.

The local frame header is a frame header generated by a clock of the near-end device itself. The associated frame header refers to a frame header that can be resolved and reverted by data transmitted by other devices through the network cable. The local frame header cannot differ greatly from the associated frame header, otherwise the data cannot be transmitted.

Step 310: performing frame header synchronization on the remote device based on the relative location.

In the embodiment of the present application, the state machine of frame header synchronization includes: an out-of-synchronization state, a super group synchronization state, and a radio frame synchronization state. The out-of-synchronization state is an initial state, indicating that a super group frame header has not reached synchronization yet. The super group synchronization state indicates that a device may detect the super group frame header at an expected location every time, and the super group number between each super group is continuous. Since the super group number is from 0 to 24, the SGN is considered to be continuous when it changes from 24 to 0. After entering this state, the remote end may resolve the CM channel and the message channel, and may revert the radio frame header based on the super group. The radio frame synchronization state indicates that the near-end device may search for the radio frame header within an error range of $\delta$ based on the local radio frame header. After entering this state, the receiving end may normally transmit baseband data.

As a preferred example of the embodiments of the application, the method further includes:

Step 311: extracting, by the near-end device, a third control word from the CM channel of the base group of the base frame sent from the remote device. The third control word represents a frame header starting location of the super group.

Specifically, the third control word is Y0 of the above control word: transmitting a K28.5 field, configured to indicate a super group beginning, wherein the super group beginning is a frame header starting location of the super group.

The Step 309 may specifically include following substep:

Substep S31: calculating the relative location of the local frame header with respect to the associated frame header based on the third control word.

The frame header location (i.e., the location of the associated frame header) of the remote device is determined based on the third control word in the CM channel of the base group of the base frame sent from the remote device. The relative location is calculated based on the location of the local frame header and the location of the associated frame header.

Figure 10:
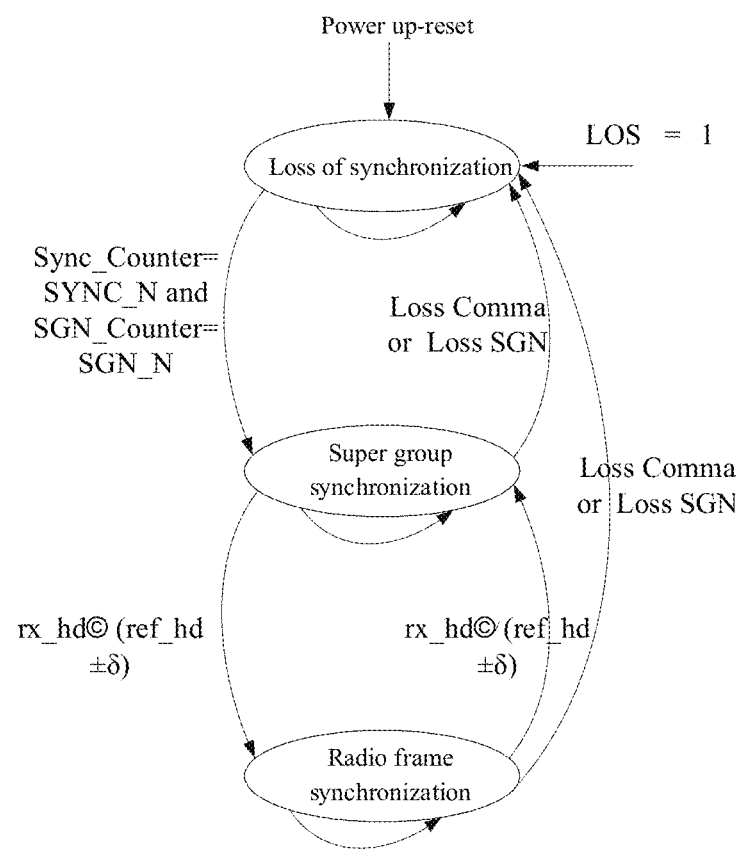
FIG. 10 is a flowchart of a synchronous state machine according to an embodiment of the application.

Referring to FIG. 10, a flowchart of a synchronous state machine according to an embodiment of the application is illustrated.

The state machine includes: an out-of-synchronization state, a super group synchronization state, and a radio frame synchronization state. When the near-end device is powered on/reset or LOS (loss of synchronization)=1, the state machine is in the LOS state. When Sync_Counter (synchronous communication)=SYNC_N and SGN_Counter=SGN_N (SGN=super group number), the state machine changes from the out-of-synchronization state to the super group synchronization state. When Loss Comma (Comma is specially encoded data transmitted on an optical link to represent K28.5 synchronization word) or Loss SGN, the state machine changes from the super group synchronization state to the out-of-synchronization state. When the relative location of the radio frame header with respect to the local frame header is less than the error range, the state machine changes from the super group synchronization state to the radio frame synchronization state. When the relative location of the radio frame header with respect to the local frame header is greater than the error range, the state machine changes from the radio frame synchronization state to the super group synchronization state. When Loss Comma or Loss SGN, the state machine changes from the radio frame synchronization state to the out-of-synchronization state.

Figure 11:
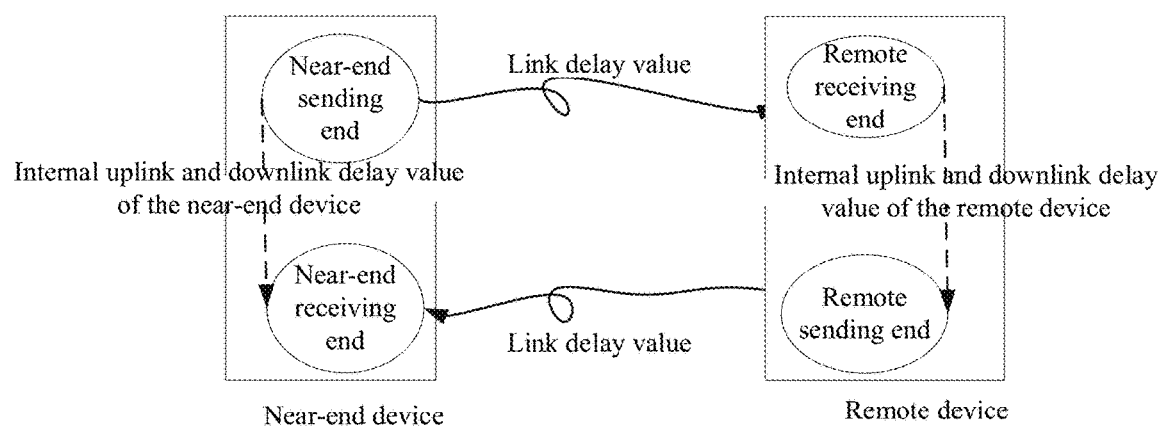
FIG. 11 is a schematic diagram of a method for calculating a link delay value according to an embodiment of the application.

Referring to FIG. 11, a schematic diagram of a method for calculating a link delay value according to an embodiment of the application is illustrated. The near-end device includes a near-end sending end and a near-end receiving end; and the remote device includes a remote sending end and a remote receiving end.

The link delay value is a delay when a base frame sent from the near-end sending end arrives at the remote receiving end, or a delay when a base frame sent from the remote device arrives at the near-end device. The link delay value may be calculated based on the following formula:

the link delay value=(the internal uplink and downlink delay values of the near-end device−the internal uplink and downlink delay values of the remote device)/2.

The internal uplink and downlink delay values of the near-end device are: time when a base frame sent from the near-end sending end passes through, in sequence, the remote receiving end, the remote sending end and the near-end receiving end. A delay timer starts timing when the near-end sending end sends the base frame, and stops timing when the near-end receiving end receives the base frame.

The internal uplink and downlink delay values of the remote device are: time when a base frame sent from the remote sending end passes through, in sequence, the near-end receiving end, the near-end sending end and the remote receiving end. A delay timer starts timing when the remote sending end sends the base frame, and stops timing when the remote receiving end receives the base frame.

Referring to FIG. 12, a flowchart of steps of a method for transmitting frame data between a near-end device and a remote device according to an embodiment of the application is illustrated, and the method may specifically include following steps.

Step 401: receiving, by the remote device, an optical fiber signal sent from the near-end device. A physical layer (PHY) converting chip is built in the remote device.

In the embodiments of the present application, the remote device specifically is an RRU, and the remote device specifically is a base station. The RRU receives the optical fiber signal sent from the base station through an optical fiber.

Step 402: reverting the optical fiber signal to a base frame in a predetermined output timing sequence by way of the physical layer (PHY) converting chip. The base frame includes a first number of super groups. The super group includes a second number of base groups. The base group includes media access control (MAC) frame structure data and an interframe gap. The output timing sequence of the physical layer (PHY) converting chip matches duration of the MAC frame structure data and the interframe gap.

The optical fiber signal is reverted to the base frame by way of the physical layer (PHY) converting chip in the RRU.

Figure 13:
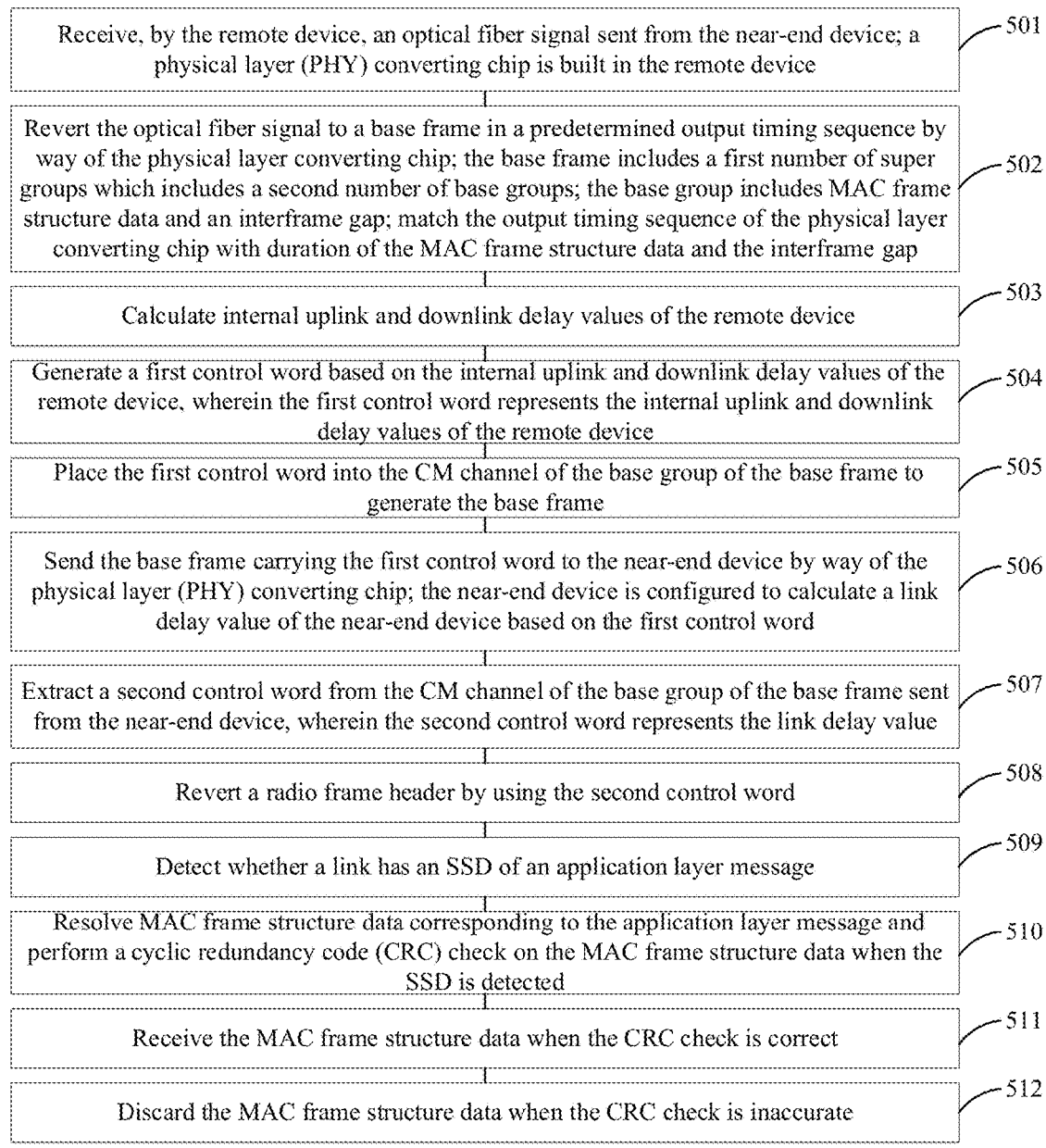
FIG. 13 is a flowchart of steps of a method for transmitting frame data between a near-end device and a remote device according to another embodiment of the application.

Referring to FIG. 13, a flowchart of steps of a method for transmitting frame data between a near-end device and a remote device according to another embodiment of the application is illustrated, and the method may specifically include following steps.

Step 501: receiving, by the remote device, an optical fiber signal sent from the near-end device. A physical layer (PHY) converting chip is built in the remote device.

In the embodiments of the present application, the remote device specifically is an RRU, and the remote device specifically is a base station. The RRU receives the optical fiber signal sent from the base station through an optical fiber.

Step 502: reverting the optical fiber signal to a base frame in a predetermined output timing sequence by way of the physical layer (PHY) converting chip. The base frame includes a first number of super groups. The super group includes a second number of base groups. The base group includes media access control (MAC) frame structure data and an interframe gap. The output timing sequence of the physical layer (PHY) converting chip matches duration of the MAC frame structure data and the interframe gap.

The optical fiber signal is reverted to the base frame by way of the physical layer (PHY) converting chip in the RRU.

Step 503: calculating, by the remote device, internal uplink and downlink delay values of the remote device.

The internal uplink and downlink delay values of the remote device represent uplink and downlink delay values of the near-end device and a network cable.

Step 504: generating a first control word based on the internal uplink and downlink delay values of the remote device. The first control word represents the internal uplink and downlink delay values of the remote device.

The first control word specifically may be a Y17 control word among the above control words.

Step 505: placing the first control word into the CM channel of the base group of the base frame to generate the base frame.

When the RRU generates the base frame, the first control word is placed into the CM channel of the base group of the base frame.

Step 506: sending the base frame carrying the first control word to the near-end device by way of the physical layer (PHY) converting chip. The near-end device is configured to calculate a link delay value of the near-end device based on the first control word.

The PHY converting chip of the RRU converts the base frame into an optical fiber signal, and then sends the optical fiber signal to the base station. The PHY converting chip of the base station reverts the optical fiber signal to the base frame, then extracts the first control word from the CM channel of the base group of the base frame, and then obtains the internal uplink and downlink delay values of the RRU based on the first control word. The base station calculates a link delay value based on the internal uplink and downlink delay values of the base station and the internal uplink and downlink delay values of the RRU.

As a preferred example of the embodiments of the application, the method further includes:

Step 507: extracting a second control word from the CM channel of the base group of the base frame sent from the near-end device. The second control word represents the link delay value.

The base station generates the second control word based on the link delay value, and then places the second control word into the CM channel of the base group of the base frame.

The RRU extracts the second control word from the CM channel of the base group of the base frame sent from the base station.

Step 508: reverting a radio frame header by using the second control word.

The RRU reverts the radio frame header based on the link delay value.

As a preferred example of the embodiments of the application, the method further includes:

Step 509: detecting whether a link has an SSD (Start of Stream Delimiter) of an application layer message.

The PHY converting chip reverts an optical fiber signal to link layer data, and the remote device detects whether a link has the SSD of the application layer message.

Step 510: resolving MAC frame structure data corresponding to the application layer message and performing a cyclic redundancy code (CRC) check on the MAC frame structure data when the SSD is detected;

Step 511: receiving the MAC frame structure data when the CRC check is correct; or Step 512: discarding the MAC frame structure data when the CRC check is inaccurate.

The remote device decides whether the application layer message exists by checking, in real time, whether there is the SSD on a link. The remote device resolves the MAC frame structure data and performs the cyclic redundancy code (CRC) check on the MAC frame structure data when the SSD is detected. The MAC frame structure data are received when the CRC check is correct; or the MAC frame structure data are discarded when the CRC check is inaccurate.

As a preferred example of the embodiments of the application, the CM channel of the base group of the base frame sent from the remote device to the near-end device includes a third control word. The third control word represents a frame header starting location of a super group.

The base station determines the frame header location (i.e., the location of the associated frame header) of the RRU based on the third control word in the CM channel of the base group of the base frame sent from the RRU. The base station calculates the relative location of the local frame header with respect to the associated frame header to implement frame header synchronization with the RRU.

It should be explained that, for a brief description, method embodiments are describe as a combination of a series of motions. However, those skilled in the art should know that the embodiments of the application are not limited by sequences of the motions described. This is because some steps may be performed by using other sequences or be performed simultaneously in accordance with the embodiments of the application. In addition, those skilled in the art should also learn that the embodiments described in the specification are preferred embodiments, and involved motions are not necessary for the embodiments of the application.

Figure 14:
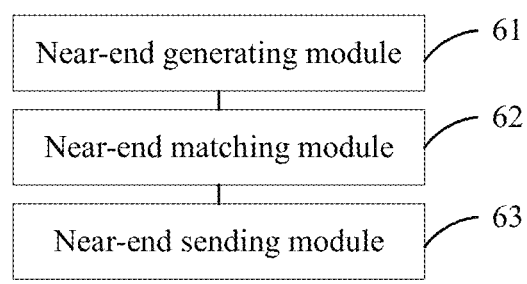
FIG. 14 is a structural block diagram of an apparatus for transmitting frame data between a near-end device and a remote device according to an embodiment of the application.

Referring to FIG. 14, a structural block diagram of an apparatus for transmitting frame data between a near-end device and a remote device according to an embodiment of the application is illustrated, and the apparatus may specifically include following modules:

a near-end generating module 61 positioned on the near-end device, configured to generate a base frame in a user-defined frame format; wherein a physical layer (PHY) converting chip is built in the near-end device; the base frame includes a first number of super groups; the super group includes a second number of base groups; and the base group includes media access control (MAC) frame structure data and an interframe gap;

a near-end matching module 62 positioned on the near-end device, configured to match duration of the MAC frame structure data and the interframe gap with an output timing sequence of the physical layer (PHY) converting chip; and a near-end sending module 63 positioned on the near-end device, configured to convert the base frame into an optical fiber signal by way of the physical layer (PHY) converting chip, and to send the optical fiber signal to the remote device.

As a preferred example of the embodiments of the application, the MAC frame structure data include: IQ data;

the near-end generating module comprises:

a near-end IQ data obtaining submodule, configured to obtain the IQ data of a sampling point of an antenna; and a near-end IQ data placing submodule, configured to place the IQ data of the sampling point of the antenna into each base group of the base frame in a predetermined format sequence.

As a preferred example of the embodiments of the application, the MAC frame structure data further include a control management (CM) channel. The CM channel is configured to transmit a control word. The apparatus further includes:

a near-end receiving module positioned on the near-end device, configured to receive a base frame sent from the remote device;

a near-end first control word extracting module positioned on the near-end device, configured to extract a first control word from the CM channel of the base group of the base frame sent from the remote device; the first control word representing internal uplink and downlink delay values of the remote device;

a near-end delay calculating module positioned on the near-end device, configured to calculate internal uplink and downlink delay values of the near-end device;

a link delay calculating module positioned on the near-end device, configured to calculate a link delay value based on the internal uplink and downlink delay values of the near-end device and the internal uplink and downlink delay values of the remote device; and a near-end timing sequence adjusting module positioned on the near-end device, configured to adjust a timing sequence of reading/writing a frame header based on the link delay value.

As a preferred example of the embodiments of the application, the near-end receiving module includes:

a near-end optical fiber signal receiving submodule, configured to receive an optical fiber signal sent from the remote device; and a near-end base frame reverting submodule, configured to revert the optical fiber signal to the base frame by way of the physical layer (PHY) converting chip.

As a preferred example of the embodiments of the application, the CM channel of the base group of the base frame sent from the near-end device to the remote device further includes a second control word. The second control word represents the link delay value. The remote device is configured to revert a radio frame header by using the second control word.

As a preferred example of the embodiments of the application, the MAC frame structure data further include a message channel, wherein the message channel is configured to transmit an application layer message.

the near-end generating module comprises:

a near-end application layer message generating submodule, configured to generate the application layer message by using an 8 B/10 B code;

a near-end indication setting submodule, configured to set an SSD (Start of Stream Delimiter) indication and an ESD (End of Stream Delimiter) indication for the application layer message, the remote device being configured to resolve corresponding MAC frame structure data and perform a cyclic redundancy code (CRC) check on the MAC frame structure data when the SSD is detected; to receive the MAC frame structure data when the CRC check is correct; or to discard the MAC frame structure data when the CRC check is inaccurate; and a near-end application layer message placing submodule, configured to place the application layer message into the message channel.

As a preferred example of the embodiments of the application, the apparatus further includes:

a frame header relative location obtaining module positioned on the near-end device, configured to obtain a relative location of a local frame header with respect to an associated frame header; the local frame header being a frame header of the near-end device; the associated frame header being a frame header of the remote device; and a near-end frame header synchronization module positioned on the near-end device, configured to perform frame header synchronization on the remote device based on the relative location.

As a preferred example of the embodiments of the application, the apparatus further includes:

a near-end third control word extracting module positioned on the near-end device, configured to extract a third control word from the CM channel of the base group of the base frame sent from the remote device; the third control word representing a frame header starting location of the super group;

the frame header relative location obtaining module comprises:

a near-end relative location calculating submodule, configured to calculate the relative location of the local frame header with respect to the associated frame header based on the third control word.

Figure 15:
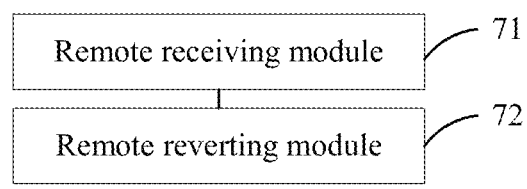
FIG. 15 is a structural block diagram of another apparatus for transmitting frame data between a near-end device and a remote device according to an embodiment of the application.

Referring to FIG. 15, a structural block diagram of another apparatus for transmitting frame data between a near-end device and a remote device according to an embodiment of the application is illustrated, and the apparatus may specifically include following modules:

a remote receiving module 71 positioned on the remote device, configured to receive an optical fiber signal sent from the near-end device, wherein a physical layer (PHY) converting chip is built in the remote device; and a remote reverting module 72 positioned on the remote device, configured to revert the optical fiber signal to a base frame in a predetermined output timing sequence by way of the physical layer (PHY) converting chip. The base frame includes a first number of super groups; the super group includes a second number of base groups; and the base group includes media access control (MAC) frame structure data and an interframe gap. The output timing sequence of the physical layer (PHY) converting chip matches with duration of the MAC frame structure data and the interframe gap.

As a preferred example of the embodiments of the application, the MAC frame structure data further include a control management (CM) channel. The apparatus further includes:

a remote delay calculating module positioned on the remote device, configured to calculate internal uplink and downlink delay values of the remote device;

a remote first control word generating module positioned on the remote device, configured to generate a first control word based on the internal uplink and downlink delay values of the remote device; the first control word representing the internal uplink and downlink delay values of the remote device;

a remote base frame generating module positioned on the remote device, configured to place the first control word into the CM channel of the base group of the base frame to generate the base frame; and a remote base frame sending module positioned on the remote device, configured to send the base frame carrying the first control word to the near-end device by way of the physical layer (PHY) converting chip; the near-end device being configured to calculate a link delay value of the near-end device based on the first control word.

As a preferred example of the embodiments of the application, the apparatus further includes:

a second control word extracting module positioned on the remote device, configured to extract a second control word from the CM channel of the base group of the base frame sent from the near-end device; the second control word representing the link delay value; and a remote radio frame header reverting module positioned on the remote device, configured to revert a radio frame header by using the second control word.

As a preferred example of the embodiments of the application, the apparatus further includes:

a remote SSD detecting module positioned on the remote device, configured to detect whether a link has an SSD (Start of Stream Delimiter) of an application layer message;

a remote CRC check module positioned on the remote device, configured to resolve MAC frame structure data corresponding to the application layer message and perform a cyclic redundancy code (CRC) check on the MAC frame structure data when the SSD is detected;

a remote data receiving module positioned on the remote device, configured to receive the MAC frame structure data when the CRC check is correct; and a remote data discarding module positioned on the remote device, configured to discard the MAC frame structure data when the CRC check is inaccurate.

As a preferred example of the embodiments of the application, the CM channel of the base group of the base frame sent from the remote device to the near-end device includes a third control word. The third control word represents a frame header starting location of a super group.

Device embodiments are basically similar to method embodiments, so description of device embodiments is relatively simple. Please see method embodiments which may serve as reference.

Embodiments of the present application further disclose a computer-readable recording medium having recorded thereon a program for executing the above methods.

The computer-readable recording medium includes any mechanism for storing or transmitting information in a computer-readable form. For example, a machine-readable medium includes a read-only memory (ROM), a random access memory (RAM), a magnetic disk storage medium, an optical storage medium, a flash memory storage medium, propagating signals (for example, carrier signal, infrared signal, digital signal and so on) in electrical, optical, acoustical or other forms, etc.

The embodiments in the specification are described in a progressive manner. Each embodiment is focused on difference from other embodiments. And cross reference is available for identical or similar parts among different embodiments.

Those skilled in the art shall understand that the embodiments of the present application may be provided as a method, a device (equipment) or a computer program product. Therefore, the present application may adopt the form of full hardware embodiments, full software embodiments or embodiments in combination of software and hardware. Furthermore, the present application may adopt the form of implementing a computer program product on one or more computer storage media (including but not limited to a magnetic disk memory, a CD-ROM, or an optical memory, and the like) comprising computer program codes.

The present application is described in reference to the flowchart and/or block diagram of a method, a device (equipment) or a computer program product according to the embodiments of the present application. It is to be understood that each flow and/or block in the flowchart and/or block diagram as well as combination of flow and/or block in the flowchart and/or block diagram may be realized by computer program instructions. These computer program instructions may be provided to a general purpose computer, a special purpose computer, an embedded processor or processors of other programmable data processing equipment so as to generate a machine so that such a device configured to achieve functions designated in one or more flows of the flowchart and/or in one or more blocks of the block diagram is generated by means of instructions executed by computers or processors of other programmable data processing equipment.

These computer program instructions may also be stored in a computer-readable memory that can guide a computer or other programmable data processing terminal equipment to work in a particular way, so that the instructions stored in the computer-readable memory generate a manufactured product including a command device that implements the designated functions in one or more flows of a flowchart and/or one or more blocks of a block diagram.

These computer program instructions may also be loaded on a computer or other programmable data processing terminal equipment, to execute a series of operating steps on the computer or other programmable terminal equipment to generate treatments implemented by the equipment, so that instructions executed on the computer or other programmable terminal equipment provide steps configured to implement designated functions in one or more flows of a flowchart and/or one or more blocks of a block diagram.

Although preferred embodiments of the embodiments of the application have been described, those skilled in the art may make additional alterations and modifications on these embodiments as soon as they know the basic creative concept. Therefore, the appended claims are intended to be interpreted as comprising preferred embodiments and all alterations and modifications falling within the scope of embodiments of the application.

Finally it should be explained that a relational term (such as a first or a second . . . ) is merely intended to separate one entity or operation from another entity or operation instead of requiring or hinting any practical relation or sequence exists among these entities or operations. Furthermore, terms such as "comprise", "include" or other variants thereof are intended to cover a non-exclusive "comprise" so that a process, a method, a merchandise or a terminal device comprising a series of elements not only includes these elements, but also includes other elements not listed explicitly, or also includes inherent elements of the process, the method, the merchandise or the terminal device. In the case of no more restrictions, elements restricted by a sentence "include a . . . " do not exclude the fact that additional identical elements may exist in a process, a method, a merchandise or a terminal device of these elements.

The method for transmitting frame data between a near-end device and a remote device and the apparatus for transmitting frame data between a near-end device and a remote device provided by this application are described in detail above. Principles and implementations of this application are set forth by using specific examples herein, and the description of the foregoing embodiments is merely intended to assist in understanding the method of this application and the core concept thereof; also, those of ordinary skill in the art may change, in according with the concept of this application, a concrete implementation and a scope of application. In conclusion, contents of the specification shall be not interpreted as limiting this application.

What is claimed is:

1. A method for transmitting frame data between a near-end device and a remote device, comprising:
generating, by the near-end device, a first base frame in a user-defined frame format, wherein a physical layer (PHY) converting chip is built in the near-end device, the first base frame comprises a plurality of super groups, each super group comprises a plurality of base groups, and each base group comprises media access control (MAC) frame structure data and an interframe gap;
matching a duration of the MAC frame structure data and the interframe gap with an output timing sequence of the physical layer (PHY) converting chip; and
converting the first base frame into an optical fiber signal through the physical layer (PHY) converting chip, and sending the optical fiber signal to the remote device.

2. The method according to claim 1, wherein the MAC frame structure data comprises IQ data;
the step of generating, by the near-end device, the first base frame in the user-defined frame format comprises:
obtaining, by the near-end device, the IQ data of a sampling point of an antenna; and
placing the IQ data of the sampling point of the antenna into the each base group of the first base frame in a predetermined format sequence.

3. The method according to claim 1, wherein the MAC frame structure data comprises a control management (CM) channel; the CM channel is configured to transmit a control word; and the method further comprises:
receiving, by the near-end device, a second base frame sent from the remote device;
extracting a first control word from the CM channel of base groups of the second base frame sent from the remote device, wherein the first control word represents internal uplink and downlink delay values of the remote device;
calculating internal uplink and downlink delay values of the near-end device;
calculating a link delay value based on the internal uplink and downlink delay values of the near-end device and the internal uplink and downlink delay values of the remote device; and
adjusting a timing sequence of reading/writing a frame header based on the link delay value.

4. The method according to claim 3, wherein the step of receiving, by the near-end device, the second base frame sent from the remote device comprises:
receiving, by the near-end device, an optical fiber signal sent from the remote device; and
reverting the optical fiber signal to the second base frame through the physical layer (PHY) converting chip.

5. The method according to claim 3, wherein the CM channel of the base groups of the first base frame sent from the near-end device to the remote device further comprises a second control word; the second control word represents the link delay value; and the remote device is configured to revert a radio frame header by using the second control word.

6. The method according to claim 5, further comprising:
obtaining, by the near-end device, a relative location of a local frame header with respect to an associated frame header, wherein the local frame header is a frame header of the near-end device, the associated frame header is a frame header of the remote device; and performing a frame header synchronization on the remote device based on the relative location.

7. The method according to claim 6, further comprising:
extracting, by the near-end device, a third control word from the CM channel of the base groups of the second base frame sent from the remote device, wherein the third control word represents a frame header starting location of the super groups;
wherein the step of obtaining, by the near-end device, the relative location of the local frame header with respect to the associated frame header comprises:
calculating the relative location of the local frame header with respect to the associated frame header based on the third control word.

8. The method according to claim 1, wherein the MAC frame structure data comprises a message channel; the message channel is configured to transmit an application layer message;
the step of generating, by the near-end device, the first base frame in the user-defined frame format comprises:
generating, by the near-end device, the application layer message by using an 8B/10B code;
setting a Start of Stream Delimiter (SSD) indication and an End of Stream Delimiter (ESD) indication for the application layer message, wherein the remote device is configured to resolve corresponding MAC frame structure data and perform a cyclic redundancy code (CRC) check on the MAC frame structure data when the SSD is detected; receiving the MAC frame structure data when the CRC check is correct; or discarding the MAC frame structure data when the CRC check is inaccurate; and
placing the application layer message into the message channel.

9. A method for transmitting frame data between a near-end device and a remote device, comprising:
receiving, by the remote device, an optical fiber signal sent from the near-end device, wherein a physical layer (PHY) converting chip is built in the remote device; and
reverting the optical fiber signal to a first base frame in a predetermined output timing sequence through the physical layer (PHY) converting chip, wherein the first base frame comprises a plurality of super groups, each super group comprises a plurality of base groups; and each base group comprises media access control (MAC) frame structure data and an interframe gap; and
matching the predetermined output timing sequence with a duration of the MAC frame structure data and the interframe gap.

10. The method according to claim 9, wherein the MAC frame structure data comprises a control management (CM) channel; and the method further comprises:
calculating, by the remote device, internal uplink and downlink delay values of the remote device;
generating a first control word based on the internal uplink and downlink delay values of the remote device, wherein the first control word represents the internal uplink and downlink delay values of the remote device;
placing the first control word into the CM channel of the base groups of the first base frame to generate a second base frame; and
sending the second base frame carrying the first control word to the near-end device through the physical layer (PHY) converting chip, wherein the near-end device is configured to calculate a link delay value of the near-end device based on the first control word.

11. The method according to claim 10, further comprising:
extracting, by the remote device, a second control word from the CM channel of the base groups of the first base frame sent from the near-end device, wherein the second control word represents the link delay value; and
reverting a radio frame header by using the second control word.

12. The method according to claim 10, wherein the CM channel of the base groups of the second base frame sent from the remote device to the near-end device comprises a third control word; and the third control word represents a frame header starting location of one of the super groups.

13. The method according to claim 9, further comprising:
detecting, by the remote device, whether a link has a Start of Stream Delimiter (SSD) of an application layer message;
resolving the MAC frame structure data corresponding to the application layer message and performing a cyclic redundancy code (CRC) check on the MAC frame structure data when the SSD is detected;
receiving the MAC frame structure data when the CRC check is correct; or
discarding the MAC frame structure data when the CRC check is inaccurate.

14. An apparatus for transmitting frame data between a near-end device and a remote device, comprising:
a near-end generating module positioned on the near-end device, configured to generate a first base frame in a user-defined frame format, wherein a physical layer (PHY) converting chip is built in the near-end device, the first base frame comprises a plurality of super groups, each super group comprises a plurality of base groups; and each base group comprises media access control (MAC) frame structure data and an interframe gap;
a near-end matching module positioned on the near-end device, configured to match a duration of the MAC frame structure data and the interframe gap with an output timing sequence of the physical layer (PHY) converting chip; and
a near-end sending module positioned on the near-end device, configured to converting the first base frame into an optical fiber signal through the physical layer (PHY) converting chip, and sending the optical fiber signal to the remote device.

15. The apparatus according to claim 14, wherein the MAC frame structure data comprises IQ data;
the near-end generating module comprises:
a near-end IQ data obtaining submodule, configured to obtain the IQ data of a sampling point of an antenna; and
a near-end IQ data placing submodule, configured to place the IQ data of the sampling point of the antenna into each base group of the first base frame in a predetermined format sequence.

16. The apparatus according to claim 14, wherein the MAC frame structure data comprises: a control management (CM) channel; the CM channel is configured to transmit a control word; and the apparatus further comprises:
a near-end receiving module positioned on the near-end device, configured to receive a second base frame sent from the remote device;
a near-end first control word extracting module positioned on the near-end device, configured to extract a first control word from the CM channel of base groups of the second base frame sent from the remote device wherein the first control word represents internal uplink and downlink delay values of the remote device;

a near-end delay calculating module positioned on the near-end device, configured to calculat internal uplink and downlink delay values of the near-end device;

a link delay calculating module positioned on the near-end device, configured to calculat a link delay value based on the internal uplink and downlink delay values of the near-end device and the internal uplink and downlink delay values of the remote device; and a near-end timing sequence adjusting module positioned on the near-end device, configured to adjusting a timing sequence of reading/writing a frame header based on the link delay value.

17. The apparatus according to claim 16, wherein the near-end receiving module comprises:

a near-end optical fiber signal receiving submodule, configured to receiver an optical fiber signal sent from the remote device; and a near-end base frame reverting submodule, configured to reverting the optical fiber signal to the second base frame through the physical layer (PHY) converting chip.

18. The apparatus according to claim 16, wherein the CM channel of the base groups of the first base frame sent from the near-end device to the remote device further comprises a second control word; the second control word represents the link delay value; and the remote device is configured to revert a radio frame header by using the second control word.

19. The apparatus according to claim 18, further comprising:

a frame header relative location obtaining module positioned on the near-end device, configured to obtain a relative location of a local frame header with respect to an associated frame header, wherein the local frame header is a frame header of the near-end device, the associated frame header is a frame header of the remote device; and a near-end frame header synchronization module positioned on the near-end device, configured to performing a frame header synchronization on the remote device based on the relative location.

20. The apparatus according to claim 19, further comprising:

a near-end third control word extracting module positioned on the near-end device, configured to extract a third control word from the CM channel of the base groups of the second base frame sent from the remote device, wherein the third control word represents a frame header starting location of the super groups;

the frame header relative location obtaining module comprises:

a near-end relative location calculating submodule, configured to calculate the relative location of the local frame header with respect to the associated frame header based on the third control word.

21. The apparatus according to claim 14, wherein the MAC frame structure data comprises a message channel; the message channel is configured to transmit an application layer message;

the near-end generating module comprises:

a near-end application layer message generating submodule, configured to generate the application layer message by using an 8B/10B code;

a near-end indication setting submodule, configured to set a Start of Stream Delimiter (SSD) indication and an End of Stream Delimiter (ESD) indication for the application layer message, wherein the remote device is configured to resolve corresponding MAC frame structure data and perform a cyclic redundancy code (CRC) check on the MAC frame structure data when the SSD is detected; to receive the MAC frame structure data when the CRC check is correct; or to discard the MAC frame structure data when the CRC check is inaccurate; and a near-end application layer message placing submodule, configured to place the application layer message into the message channel.

* * * * *